US006628423B1

(12) United States Patent
Sasaki

(10) Patent No.: US 6,628,423 B1
(45) Date of Patent: Sep. 30, 2003

(54) DUMMY SHEET PLACED ON ROTARY DRUM OF IMAGE RECORDING APPARATUS

(75) Inventor: Yoshiharu Sasaki, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/280,864

(22) Filed: Mar. 30, 1999

(30) Foreign Application Priority Data

Mar. 31, 1998 (JP) .......................................... 10-087018

(51) Int. Cl.[7] ............................ G06F 15/00; B41J 2/01; B41J 11/48; G01D 9/42

(52) U.S. Cl. .......................... 358/1.7; 358/1.4; 358/1.7; 347/104; 347/262; 346/103; 346/138; 400/659; 400/26; 101/378; 101/232; 101/401.1

(58) Field of Search .................. 358/1.4, 1.7; 347/104, 347/262, 264; 346/103, 132, 138; 400/659, 26; 101/378, 389, 232, 401.1

(56) References Cited

U.S. PATENT DOCUMENTS

| | | | | | |
|---|---|---|---|---|---|
| 3,824,927 | A | * | 7/1974 | Pugh et al. | 101/378 |
| 5,183,252 | A | * | 2/1993 | Wolber et al. | 271/276 |
| 5,280,307 | A | * | 1/1994 | Parsons | 101/232 |
| 5,716,048 | A | * | 2/1998 | Morrissette | 101/389.1 |
| 6,244,179 | B1 | * | 6/2001 | Sasaki | 101/401.1 |
| 2001/0048834 | A1 | * | 12/2001 | Sasaki | 400/118.2 |

FOREIGN PATENT DOCUMENTS

| | | | |
|---|---|---|---|
| EP | 0 673 775 A1 | 9/1995 | B41J/13/22 |
| JP | 4-26594 | 1/1992 | C30B/29/02 |
| JP | 4-327982 | 11/1992 | B41M/5/26 |
| JP | 4-327983 | 11/1992 | B41M/5/26 |

* cited by examiner

*Primary Examiner*—Edward Coles
*Assistant Examiner*—Monica Mitchell
(74) *Attorney, Agent, or Firm*—Sughrue Mion, PLLC

(57) ABSTRACT

An image recording apparatus comprises a rotary drum for attracting a recording medium to the surface thereof on which a plurality of through holes are formed, the rotary drum for attracting the recording medium via the plural holes by reducing pressure therein, a laser head for emitting a laser beam toward the recording medium on the rotary drum to record an image thereon; and a dummy sheet having an attracting area in which a plurality of through holes are formed, the area having a size substantially equal to the recording medium, the dummy sheet placed between the recording medium and the surface of the rotary drum such that the recording medium is placed on the attracting area and such that the plural through holes of the attracting area and the plural through holes of the rotary drum are superposed.

26 Claims, 11 Drawing Sheets

DUMMY SHEET PLACED ON ROTARY DRUM OF IMAGE RECORDING APPARATUS

BACKGROUND OF THE INVENTION

The present invention relates to an image recording apparatus for recording image information, text information, etc., on a recording medium by using K (black), C (cyan), M (magenta), and Y (yellow) color toner sheets and a dummy sheet on which a recording medium is placed for use with the apparatus.

In a related image recording apparatus irradiates a recording medium fixed on a rotary drum with a laser beam, etc., from an optical head for recording an image. In this case, a toner sheet having a thermal-transferable toner layer formed on a substrate such as a transparent PET base, etc., and an image receiving sheet having an image receiving layer for receiving transferred toner are used for the recording medium. The toner sheet is heated in response to image data and the heated portion of the toner layer is transferred to the image receiving layer of the image receiving sheet, thereby recording an image on the image receiving sheet.

Specifically, a toner sheet comprising heat-molten or heat-adhesive color material layers (a light-heat conversion layer and a toner layer) formed on a substrate is used. The toner sheet and an image receiving sheet are superposed on each other at least at a recording position and the toner layer and the image receiving sheet are brought into intimate contact with each other. A latent image is formed on the toner layer by heating based on image data with a laser beam, etc., from the rear side of the toner sheet or the image receiving sheet, then the toner sheet and the image receiving sheet are peeled off, whereby an exposed portion of the toner layer is transferred to the image reception layer for transferring an image onto the image receiving sheet.

First, the related image recording apparatus will be discussed with reference to FIG. 9, which is a perspective view of the related image recording apparatus.

In FIG. 9, numeral 1 denotes an optical head being movable in a one-dimensional direction and having a plurality of laser beams for on/off-modulating the laser beams according to record data and applying the modulated laser beam. Numeral 2 denotes a rotary drum rotating at high speed with a recording medium placed thereon and numeral 3 denotes a recording medium for CTP (computer to plate), DDCP (direct digital color proofer), lith, or the like having a different structure in response to the use. Numeral 4 denotes a stage (or subscan stage) movable with the optical head 1 mounted thereon on a rail in parallel with the recording medium 3 on the rotary drum 2; while moving, the optical head 1 irradiates the recording medium 3 with a laser beam for recording an image. Such a movement corresponds to the subscanning direction at the time of image forming and the main scanning direction corresponds the rotation direction of the rotary drum 2.

Next, the structure of the recording medium 3 placed in the image recording apparatus will be discussed with reference to FIG. 10.

FIG. 10 is an illustration to show the structures of an image reception sheet 31 and a toner sheet 32 making up the recording medium 3 shown in FIG. 9. An actual recording process on the recording medium 3 is executed by a thermal transfer sheet such as the toner sheet 32 forming a part of a recording medium (for CTP, DDCP, lith, etc.,) as shown in FIG. 10. The toner sheet 32 is made up of a substrate 33, a light-heat conversion layer 34, and a toner layer 35 in order from the laser light application side. On the other hand, the image receiving sheet 31 is made up of an image receiving layer 36, a cushion layer 37, and a substrate 38 in order from the toner sheet 32 side. If the toner sheet 32 is superposed on the image receiving sheet 31 with the toner layer directed toward the image receiving sheet 31 side and laser light is applied, the toner layer portion to which the laser light is applied is heated and transferred to the light reception layer.

A material to allow laser light to transmit therethrough, such as a PET (polyethylene terephthalate) base, a TAC (cellulose triacetate) base, or a PEN (polyethylene naphthalate) base, is used as the substrate of the toner sheet 32 shown in FIG. 10. A substance for efficiently converting laser energy into heat, such as carbon, a black substance, an infrared absorption pigment, or a specific wavelength absorption matter, is used as the heat-light conversion layer. K, C, M, and Y color toner sheets are available as the toner layer; in addition, toner sheets of gold, silver, brown, gray, etc., may be used. The color toner sheets differ in heating and recording characteristics depending on the color.

The image receiving layer of the image receiving sheet 31 is adapted to receive transferred toner. The cushion layer serves as level difference absorption when toners are superposed at multiple stages. The structures also vary depending on the use; the used toner sheets and image receiving sheets are described in detail in Unexamined Japanese Patent Publications Nos. 4-26594A, 4-327982A, and 4-327983A according to the applications of the present applicant.

Next, a specific image recording procedure will be discussed with reference to FIGS. 11(*a*) to (*f*).

FIGS. 11(*a*) to (*f*) show recording process for executing a recording process on the image receiving sheet 31 shown in FIG. 10 for each of K, C, M, and Y. The recording process in each of the four colors K, C, M, and Y consists mainly of a step for executing laser recording according to color data and a step for peeling the toner sheet 32 from the image receiving sheet, 31 after recording.

A process for recording K color on a medium will be discussed.

At step (1), the image receiving sheet 31 is wrapped around the rotary drum, which is not shown for sake of clarity, but would be located under image receiving sheet 31 (FIG. 11(*a*)). Next, at step (2), to execute the K color recording process, a K color toner sheet 32 is put on the image receiving sheet 31 (FIG. 11(*b*)). Next, at step (3), they are laminated as required (FIG. 11(*c*)). Next, at step (4), the K color toner sheet side is irradiated with laser light for recording based on K color image, text data (FIG. 11(*d*)). Further, at step (5), the K color toner sheet 32 is peeled off the image receiving sheet 31 and the K color recording process is complete (FIG. 11(*e*)).

A process for recording C color on a medium like the K color recording process will be discussed.

At step (6), a C color toner sheet is put on the image receiving sheet 31. Next, at step (7), they are laminated as required. Next, at step (8), the, C color toner sheet side is irradiated with laser light for recording based on C color image, text data. Further, at step (9), the C color toner sheet is peeled off the image receiving sheet 31 and the C color recording process is complete.

A process for recording M color on a medium like the C color recording process will be discussed.

At step (10), an M color toner sheet is put on the image receiving sheet 31. Next, at step (11), they are laminated as required. Next, at step (12), the M color toner sheet side is irradiated with laser light for recording based on M color image, text data. Further, at step (13), the M color toner sheet is peeled off the image receiving sheet 31 and the M color recording process is complete.

A process for recording Y color on a medium like the M color recording process will be discussed.

At step (14), a Y color toner sheet is put on the image receiving sheet 31. Next, at step (15), they are laminated as required. Next, at step (16), the Y color toner sheet side is irradiated with laser light for recording based on Y color image, text data. Further, at step (17), the Y color toner sheet is peeled off the image receiving sheet 31 and the Y color recording process is complete.

Thus, at the last step (18), the four colors K, C, M, and Y may or may not overlap each other on the image receiving sheet 31, completing a necessary color image (FIG. 11(*f*)).

Thus, in the image recording apparatus, as shown in FIG. 9, the recording medium 3 comprising each toner sheet 32 using heat-molten, heat-adhesive, or sublimate toner superposed on the image receiving sheet 31 in intimate contact relation is pasted and fixed at the position determined by a registration on the surface of the rotary drum 2 and is irradiated with a laser beam, etc., from the optical head 1 for executing KCMY color image recording, etc. Since the rotary drum 2 rotates at fairly high speed during recording, air in the rotary drum 2 is sucked for lowering the pressure therein by an external air blower (or a vacuum pump, etc.,) as a suction source through a suction pipe and the recording medium 3 is vacuum-attracted through a large number of attracting holes made in the surface of the rotary drum 2 and an attraction groove for reliably holding and fixing the recording medium 3 so that the recording medium 3 does not float, shift, or curl up from the rotary drum 2.

FIG. 12 is a sectional view to show the principle of an attraction mechanism of the related rotary drum 2. The vacuum attraction mechanism is as follows: The rotation shaft of the rotary drum 2 is made hollow, is formed with a large number of rotation shaft holes 7, and is coupled to a suction pipe of the vacuum attraction mechanism such as an air blower 5 or a vacuum pump, and the blade of the air blower 5 is turned by a drive source such as a motor for sucking air in the rotary drum 2 through the rotation shaft holes 7 for reliably vacuum-attracting and fixing the recording medium 3 through attracting holes 21 of the rotary drum 2.

FIG. 13 is a fragmentary cutaway development view of the related rotary drum 2. In the figure, the outermost rectangle indicates that the rotary drum 2 is cut and developed along the axial direction. The rectangle inside the outermost rectangle is the recording medium 3 attracted onto the rotary drum 2. Each circle denotes an attracting hole 21. Here, the circles are drawn large for illustration to easily understand the placement relationship between the rotary drum 2 and the attracting holes 21 placed thereon. The actual size and number of the attracting holes 21 do not correspond to those shown in FIG. 13; the actual size is smaller than that in FIG. 13 and the actual number of the attracting holes 21 is greater than that in FIG. 13. An attraction groove 22 for strongly fixing the upstream leading end of the recording medium 3 is formed in the upper portion.

By the way, with the related image recording apparatus described, if a recording medium of a size smaller than the size matching the placement of the attracting holes 21 and the attraction groove 22 of the rotary drum 2 is used (see FIG. 14), attraction leakage occurs from some of the unclosed attracting holes 21 and the unclosed attraction groove 22 although an air blow having a large air flow quantity is used as the suction source. Thus, centrifugal force produced when the rotary drum 2 is rotated at high speed causes the recording medium 3 to be detached from the drum or makes insufficient intimate contact between the toner sheet 32 and the image receiving sheet 31, producing image unevenness. FIG. 15 is a graph to show change in vacuum pressure in the rotary drum 2 with respect to the number of unclosed attracting holes.

To solve this problem, the attracting holes 21 and the attraction groove 22 in the area other than the recording medium area of the rotary drum 2 can be previously covered with adhesive tape, etc. In this method, to cover the attracting holes, it is possible that tape and the recording medium do not overlap each other by finely changing the size of the recording medium 3 or adjusting the attachment position; however, the attraction groove 22 must be covered completely with the recording medium 3 or tape and it is difficult to attach the recording medium 3 without any level difference from the tape on the rotary drum 2. That is, the recording medium 3 and tape overlap each other or a clearance is created between the recording medium 3 and tape.

This covering method with tape requires that tape be stripped off and put or be changed in position each time the size of the recording medium 3 is changed; it is burdensome and also takes time. If the rotary drum 2 is on the outside of the apparatus, no trouble occurs, but if the rotary drum 2 is at the depth of the apparatus, the covering method with tape becomes complicated or cannot be handled by the user in some cases. When the adhesive of tape remains on the rotary drum 2, if the user does not notice it, the thickness direction of the recording medium 3 at the place changes and the focus with a laser spot is not obtained, thus image unevenness, etc., occurs and normal recording cannot be executed in some cases. Even if the user notices it, the remaining adhesive is not completely removed because it is hard to find visually, or if the rotary drum 2 is at the depth of the apparatus, the user is hard to reach the remaining adhesive and often cannot completely remove it. Thus, a fundamental solution cannot be provided by the method of covering with tape the attracting holes 21 and the attraction groove 22 in the area other than the recording medium 3 area of the rotary drum 2.

SUMMARY OF THE INVENTION

It is therefore an object of the present invention to provide an image recording apparatus, if a recording medium of a size other than the size matching placement of attraction groove and attracting holes of a rotary drum is used, for preventing the recording medium from being detached from the rotary drum or image unevenness from occurring due to insufficiently intimate contact between a toner sheet and an image receiving sheet making up the recording medium, and a dummy sheet on which a recording medium is placed for use with the image recording apparatus.

In order to achieve the above object, there is provided an image recording apparatus comprising: a rotary drum for attracting a recording medium to the surface thereof on which a plurality of through holes are formed, the rotary drum for attracting the recording medium via the plural holes by reducing pressure therein; a laser head for emitting a laser beam toward the recording medium on the rotary drum to record an image thereon; and a dummy sheet having an attracting area in which a plurality of through holes are formed, the area having a size substantially equal to the recording medium, the dummy sheet placed between the recording medium and the surface of the rotary drum such that the recording medium is placed on the attracting area and such that the plural through holes of the attracting area and the plural through holes of the rotary drum are superposed.

The dummy sheet may be formed into a size covering an outer periphery of the rotary drum.

The plural through holes of the dummy sheet and the rotary drum may include through holes formed into a slit shape.

According to the configuration, the dummy sheet is placed on the rotary drum and a recording medium is placed on the dummy sheet on the rotary drum, whereby the plural through holes of the rotary drum are closed almost completely. Therefore, even if an air blower having a small air flow quantity is used, the recording medium can be securely fixed to the rotary drum.

Therefore, if it is used a recording medium of a size other than the size matching the placement of the plural holes of the rotary drum, the recording medium is not detached from the rotary drum.

It may be configured that: the recording medium includes a toner sheet having a toner layer and an image receiving sheet having a smaller size than the toner sheet for receiving toner transferred by the laser beam, and the dummy sheet includes a spacer to be interposed between the surface thereof and the toner sheet.

It may be configured that: the thickness of the spacer is substantially equal to the thickness of the image receiving sheet.

It may be configured that: the spacer is provided on a circumferencial portion of the attracting area.

According to the configuration, the toner sheet is larger than the image receiving sheet, thus the extra portion does not overlap the image receiving sheet, producing a level difference. Then, to remove the level difference, the dummy sheet on which recording medium is placed is provided with the spacer for correcting the thickness of the extra portion of the toner sheet not overlapping the image receiving sheet (namely, correcting the level difference), whereby image unevenness is not caused by insufficiently intimate contact between the toner sheet and the image receiving sheet making up the recording medium or by distortion of deformation of the toner sheet.

It may be configured that: the image recording apparatus further comprises a plurality kinds of dummy sheets having a plurality sizes of attracting area corresponding to sizes of an image recording medium to be used, wherein a dummy sheet having a suitable size of the attracting area is selected and placed on the surface of the rotary drum before the recording medium is placed on the rotary drum.

Accordingly, recording media of various sizes can be reliably fixed to the rotary drum.

It may be configured that: the dummy sheet having an attracting area made of a porous material, the attracting area having a size substantially equal to the recording medium, the dummy sheet placed between the recording medium and the surface of the rotary drum such that the recording medium is placed on the attracting area.

According to the configuration, the dummy sheet need not be formed with through holes matching the placement of the plural holes of the rotary drum.

DETAILED DESCRIPTION OF THE PREFERRED EMBODIMENTS

Referring now to the accompanying drawings, there are shown preferred embodiments of the present invention.

Figure 1:
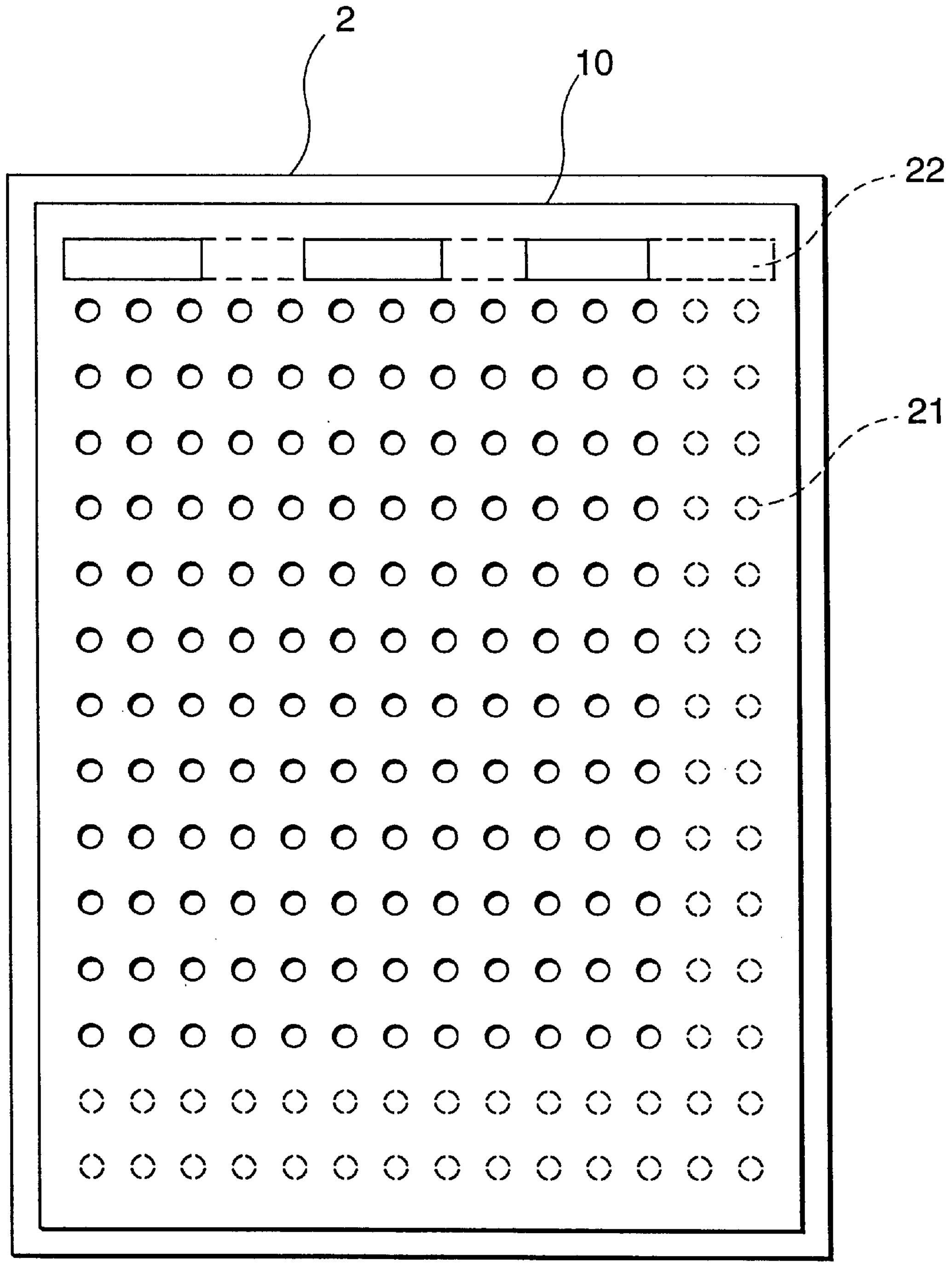
FIG. 1 is a fragmentary cutaway development view of a rotary drum of a first embodiment according to the present invention.

FIG. 1 is a fragmentary cutaway development view of a rotary drum 2 of a first embodiment according to the present invention.

To use a recording medium of a size smaller than a recording medium of the size matching the placement of attracting holes 21 and an attraction groove 22 of a rotary drum 2, the first embodiment provides a dummy sheet 10 placed on the rotary drum 2 (hereinafter, dummy sheet) capable of preventing attraction leakage from any portion other than the portion where the recording medium is attached for reliably fixing the recording medium to the rotary drum 2. The dummy sheet 10 is formed to a size covering almost all of the outer periphery of the rotary drum 2 and is formed with a groove and holes made in an area of almost the same size as the recording medium matching the attracting holes 21 and the attraction groove 22 of the rotary drum 2. A soft material, such as PET, is used for the dummy sheet 10.

Figure 2:
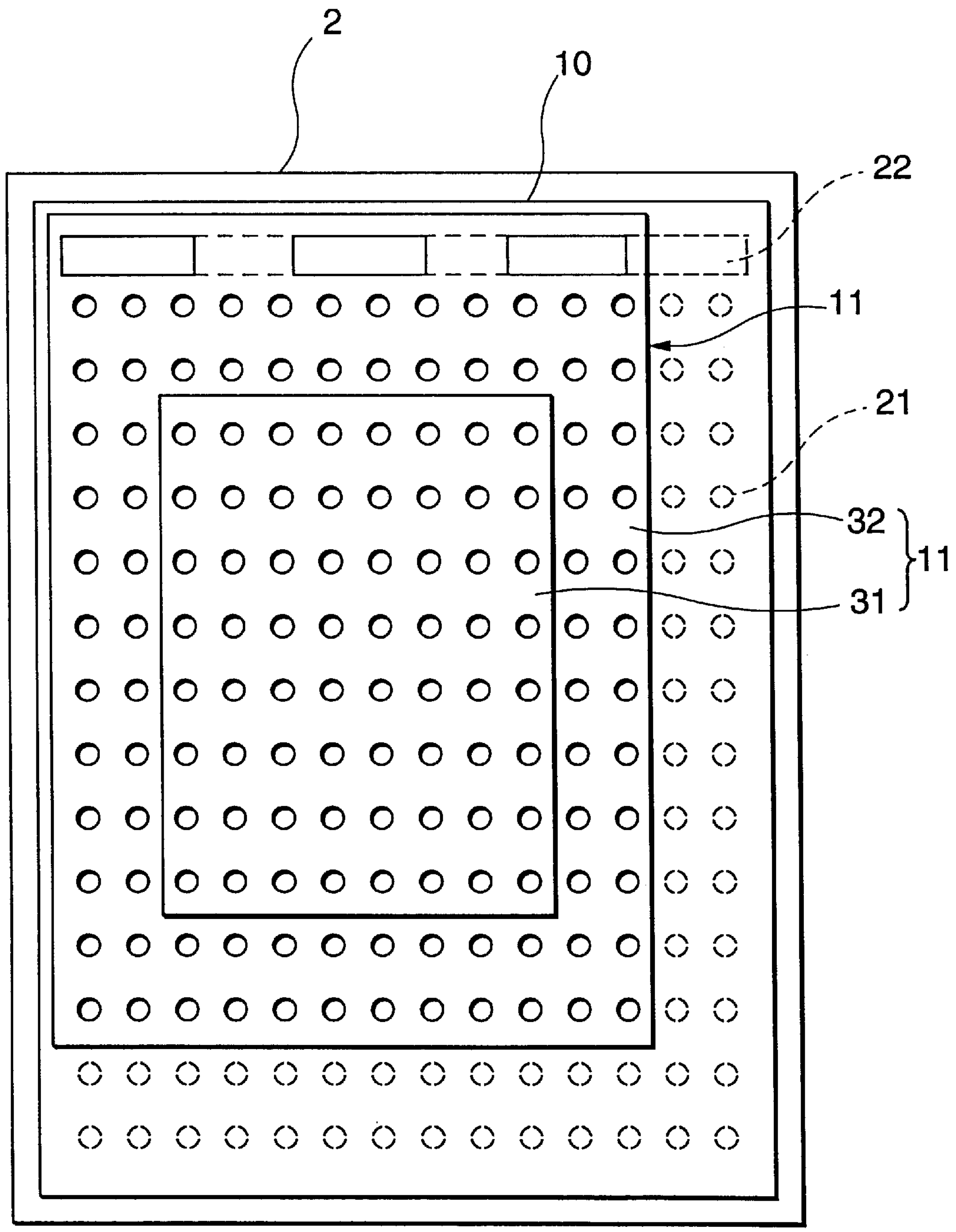
FIG. 2 is a fragmentary cutaway development view of the rotary drum when a recording medium is placed.

The dummy sheet 10 is used for a recording medium 11 of the size shown in FIG. 2. The dummy sheet 10 shown in FIG. 2 does not have attracting holes 21 corresponding to the two right end columns and the two bottom rows of the attracting holes 21 of the rotary drum 2 and does not have a groove corresponding to the portion of the attraction groove 22 common to the two right end columns of the attracting holes 21. That is, the dummy sheet 10 has holes and groove only in the area of almost the same size as the recording medium 11 and closes the attracting holes 21 and the attraction groove 22 of the rotary drum 2 in the area other than the size of the recording medium 11. This structure of the dummy sheet 10 enables the attracting holes 21 and the attraction groove 22 of the rotary drum 2 to be almost completely closed by previously placing the dummy sheet 10 on the rotary drum 2 before or at the time the recording medium 11 is placed on the rotary drum 2. Therefore, if an air blower having a small air flow quantity is used, the recording medium 11 can be securely fixed to the rotary drum 2.

The groove of the dummy sheet 10 is made shorter than the attraction groove 22 of the rotary drum 2 matching the size of the recording medium 11. The attracting holes 21 denoted by the circles in the figures are drawn large for illustration to easily understand the placement relationship between the rotary drum 2 and the attracting holes 21 placed thereon. The actual size and number of the attracting holes 21 do not correspond to those shown in the figures; the actual size is smaller than that shown and the actual number of the attracting holes 21 is greater than that shown. However, the diameter of the hole of the dummy sheet 10 need not be the same as that of the attracting hole 21 of the rotary drum 2; it may be 2 mm or less.

Figure 3:
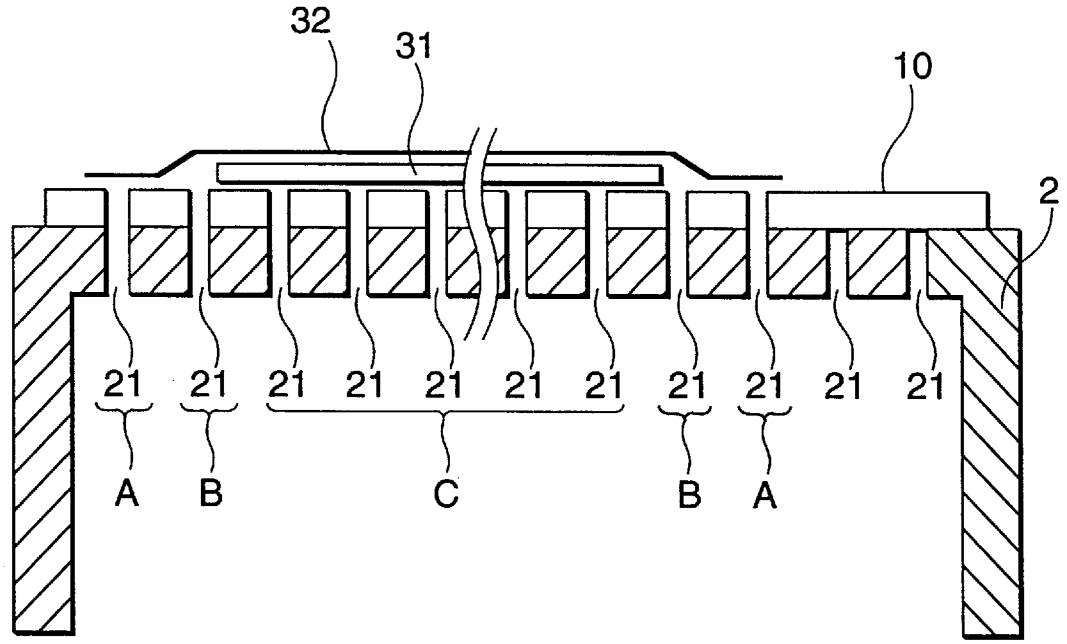
FIG. 3 is a sectional view of FIG. 2.
Figure 13:
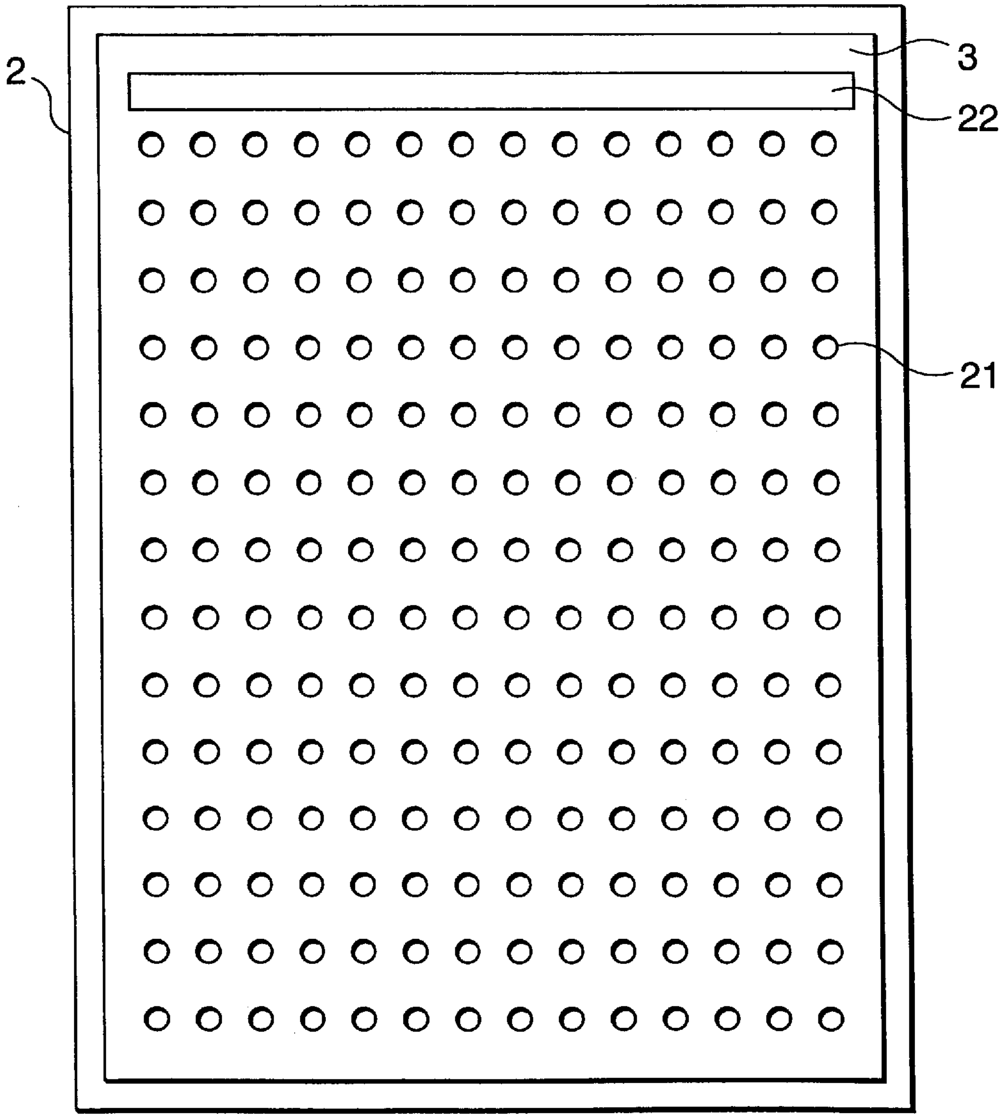
FIG. 13 is a fragmentary cutaway development view of the related rotary drum.
Figure 14:
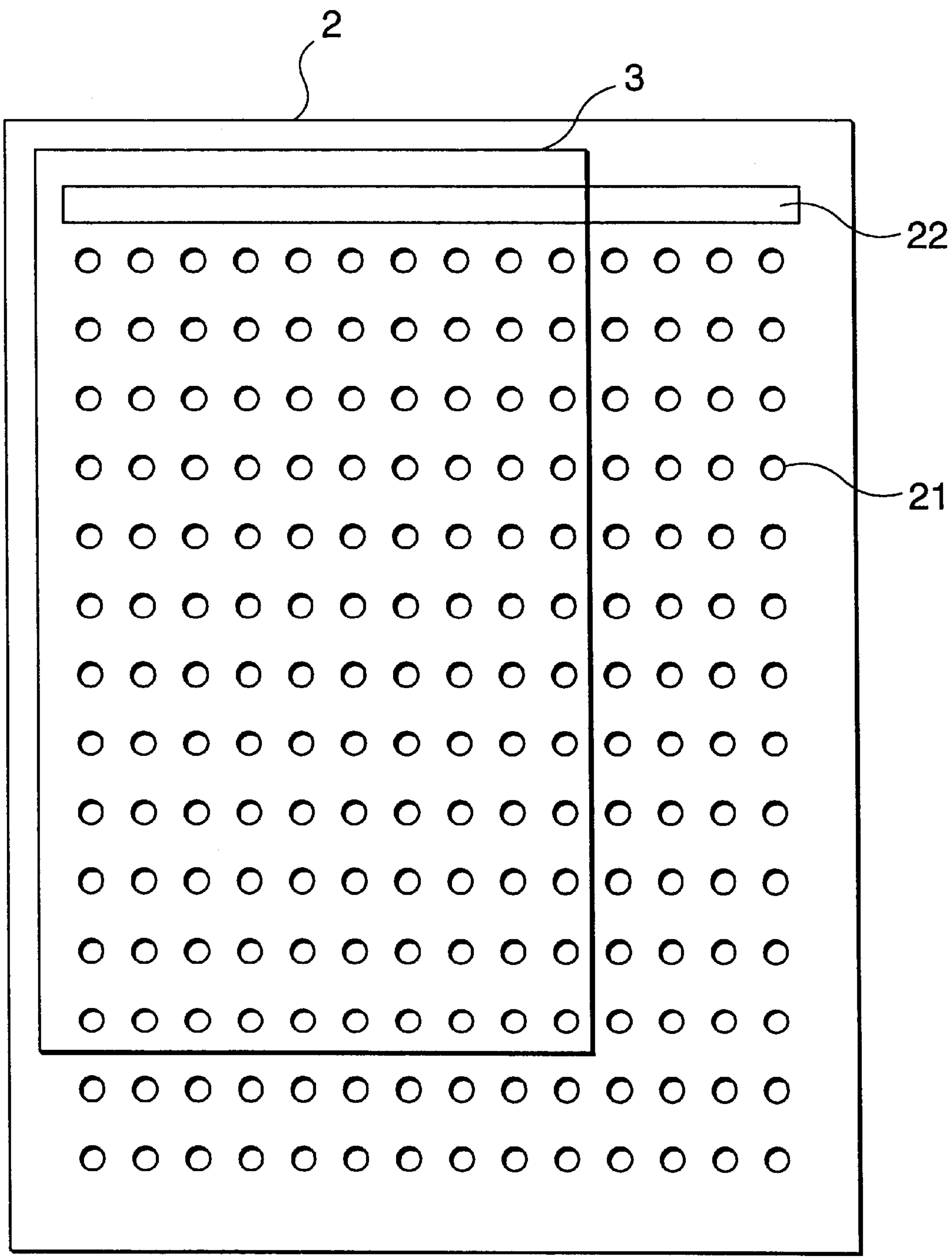
FIG. 14 is an illustration to show a problem in the related rotary drum.
Figure 15:
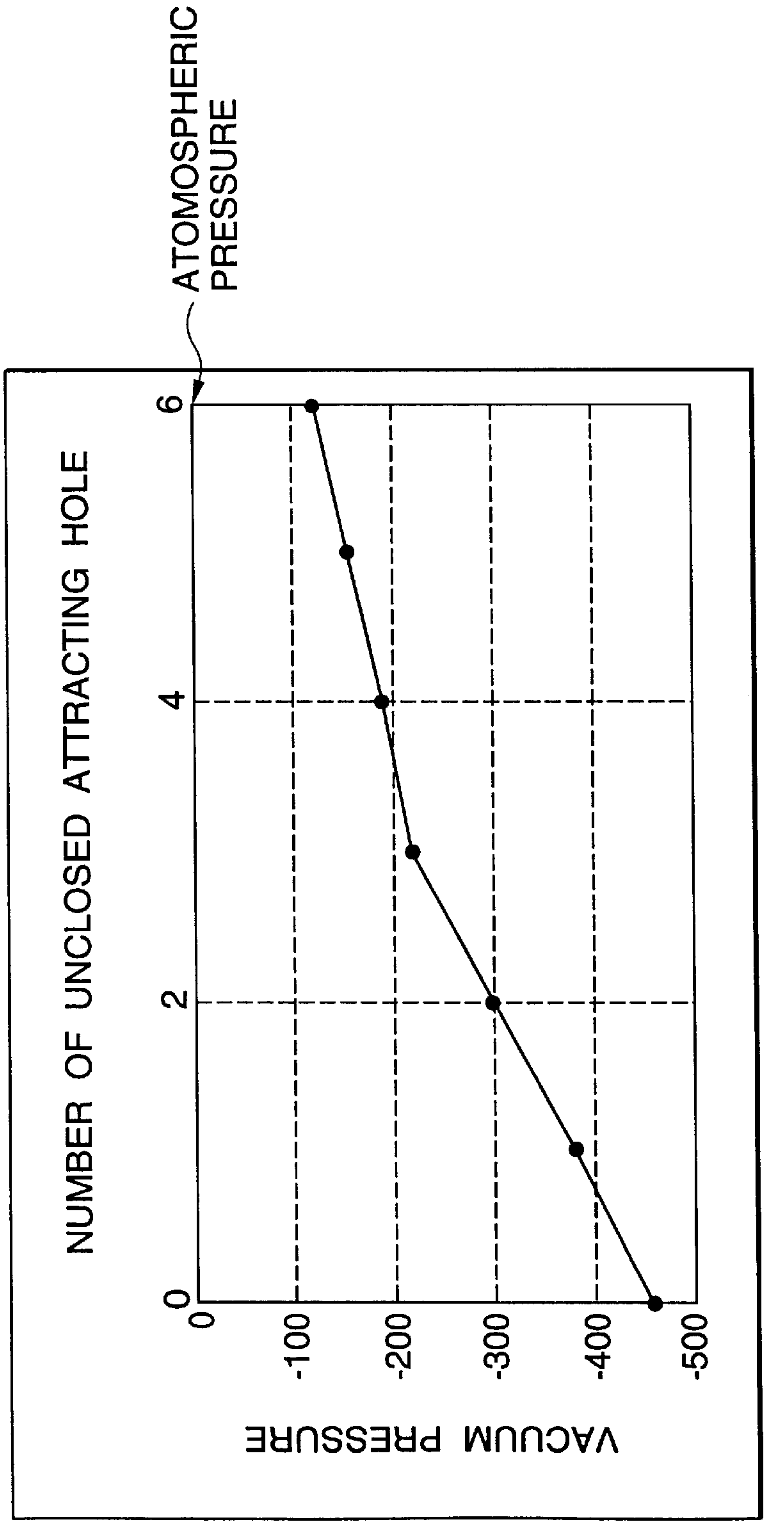
FIG. 15 is an illustration to show the problem in the related rotary drum.

FIG. 1 shows flat the state in which the dummy sheet 10 is attached to the rotary drum 2 previously described with reference to FIG. 13 and FIG. 2 shows flat the state in which the recording medium 11 is put on the dummy sheet 10. FIG. 3 is a sectional view of the state in which the dummy sheet 10 and the recording medium 11 are attached to the rotary drum 2, wherein the dummy sheet 10 and the recording medium 11 are not hatched.

Figure 4:
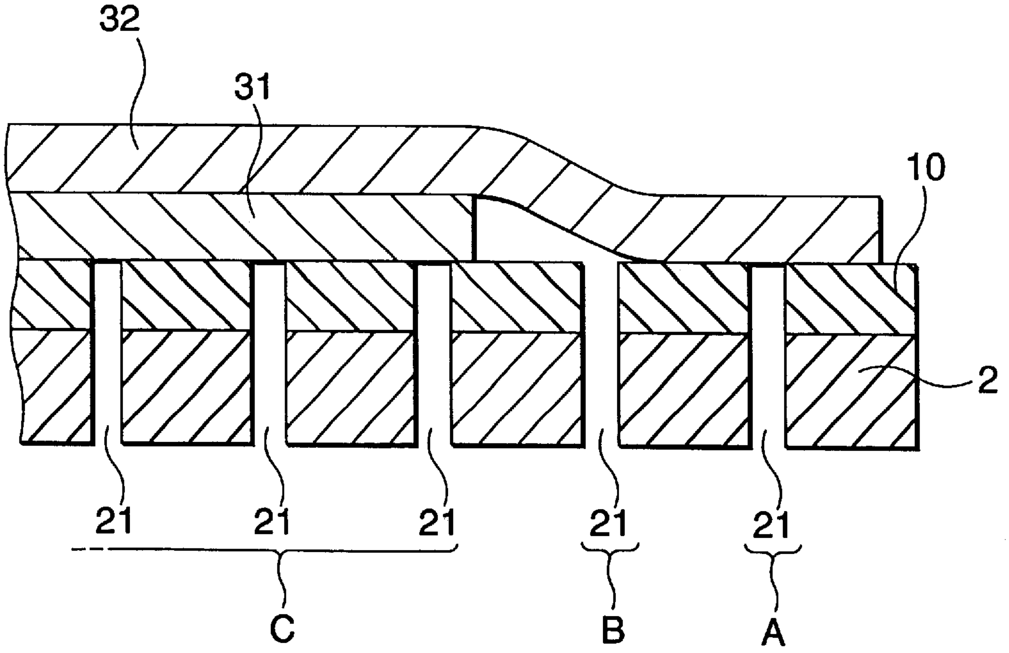
FIG. 4 is an enlarged view of a part of FIG. 3.

In FIG. 3, of the attracting holes 21 made in the rotary drum 2 and the holes of the dummy sheets corresponding to the attracting holes 21, the holes indicated by letter A serve as attraction of a toner sheet 32, the holes indicated by letter B serve as bringing an image receiving sheet 31 and the toner sheet 32 into intimate contact with each other, and the holes indicated by letter C serve as attraction of the image receiving sheet 31. FIG. 4 is an enlarged view of a part of FIG. 3.

In FIG. 3 and FIG. 4, the positional relationships among the image receiving sheet 31, the toner sheet 32, and the holes of the rotary drum 2 and the dummy sheet 10 are made optimum intentionally. Thus, the positional relationships among the image receiving sheet 31, the toner sheet 31, and the holes become sectional views as shown in FIG. 3 and FIG. 4.

Different types of dummy sheets 10 each having the attracting holes and groove responsive to the size of the recording medium to be used are thus provided, whereby recording media of various sizes can be reliably fixed to the rotary drum 2.

Thus, in the first embodiment, the dummy sheet 10 is provided which is formed to the size covering almost all of the outer periphery of the rotary drum 2 and is formed with the groove and holes made in the area of almost the same size as the recording medium 11 matching the attracting holes 21 and the attraction groove 22 of the rotary drum 2, and is placed on the rotary drum 2 before or at the time the recording medium 11 is placed on the rotary drum 2, whereby if an image receiving sheet 31 of a size smaller than the recording medium 11 of the size matching the placement of the attracting holes 21 and the attraction groove 22 of the rotary drum 2 is used, the recording medium 11 and the image receiving sheet 31 can be reliably fixed to the rotary drum 2 without causing attraction leakage.

Figure 5:
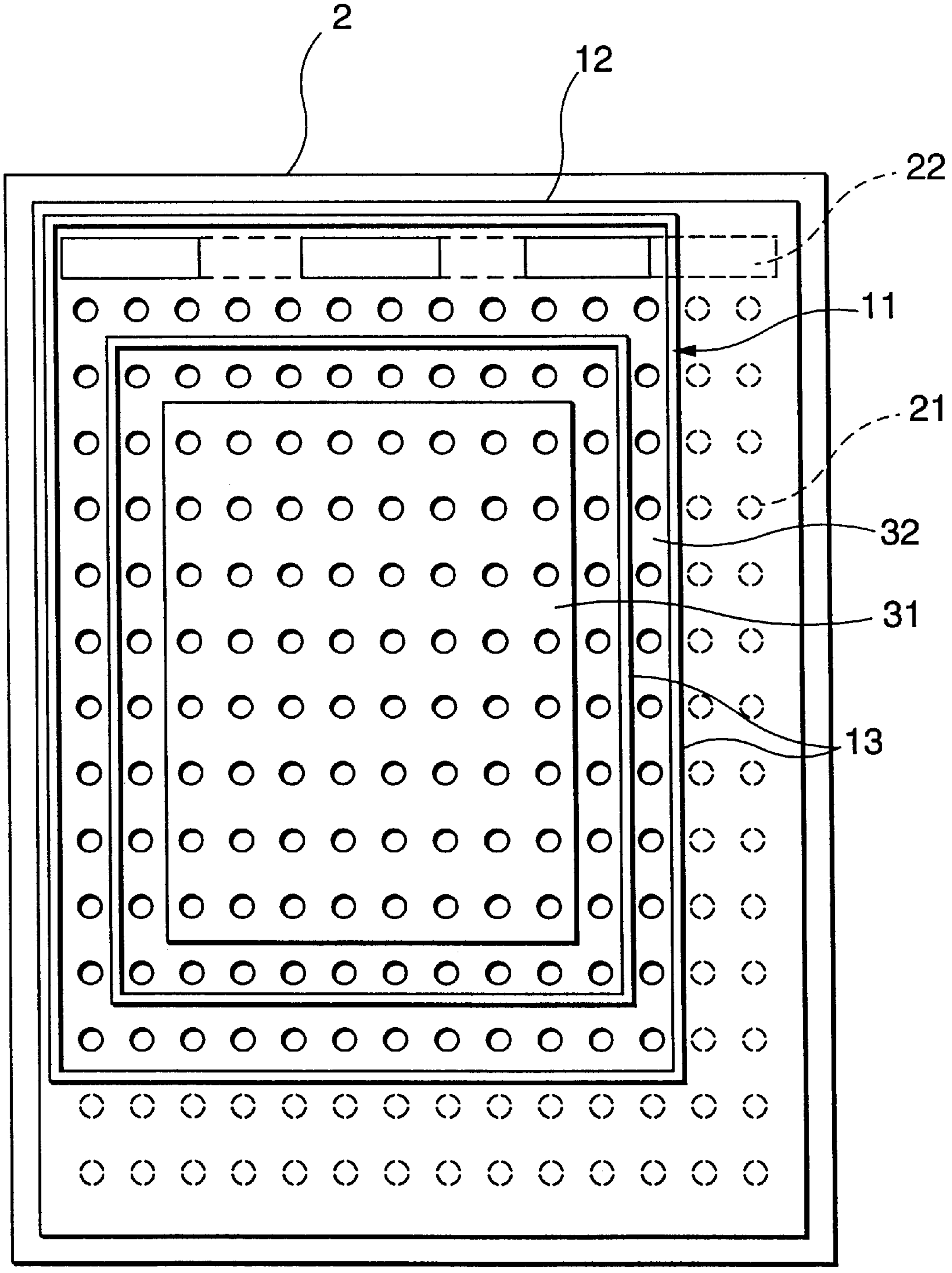
FIG. 5 is a fragmentary cutaway development view of a rotary drum of a second embodiment according to the present invention.

FIG. 5 is a fragmentary cutaway development view of a rotary drum 2 according to a second embodiment of the present invention.

Figure 6:
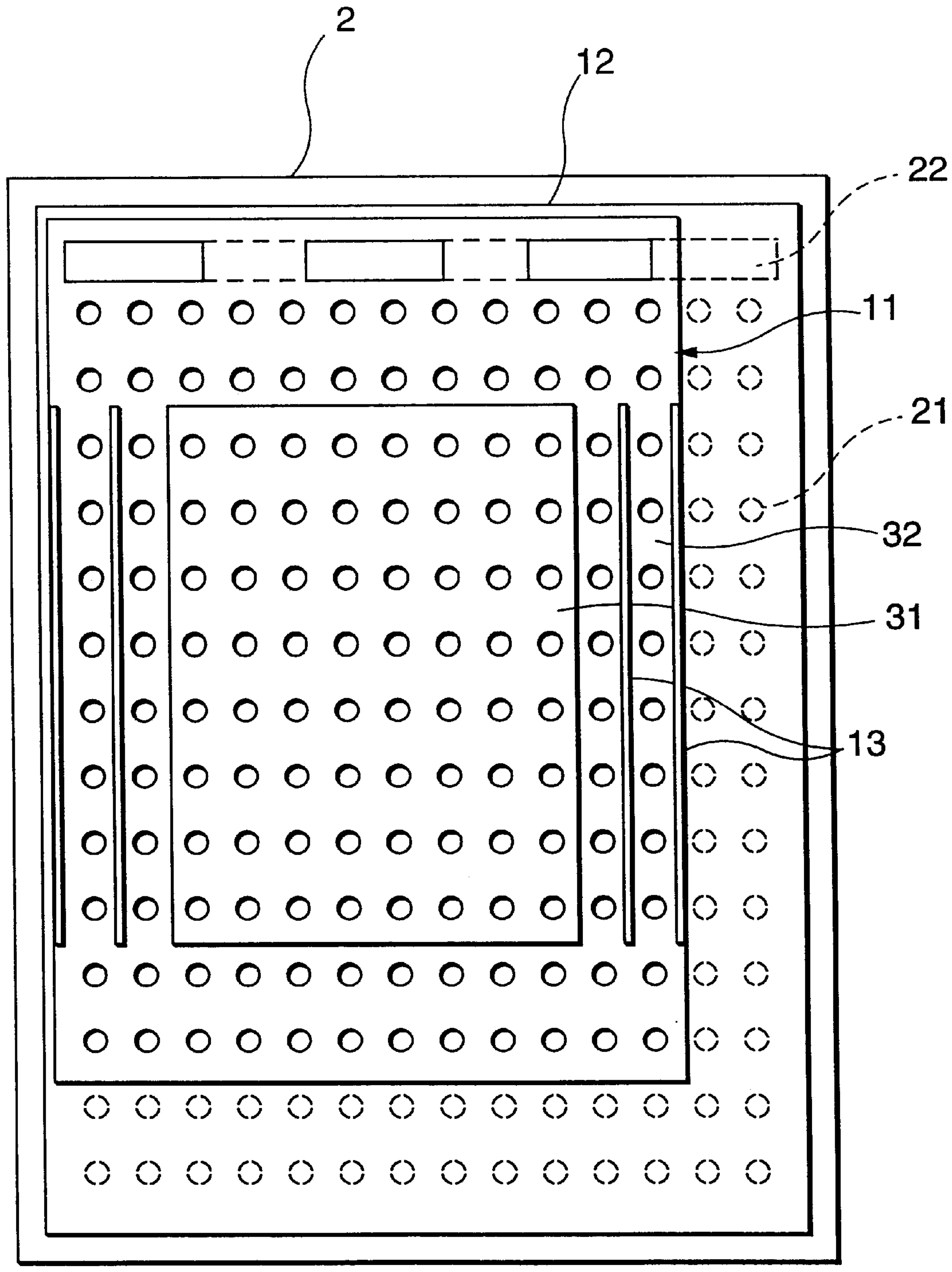
FIG. 6 is a fragmentary cutaway development view of the rotary drum of the second embodiment according to the present invention.

The second embodiment provides a dummy sheet 12 placed on a rotary drum (simply, dummy sheet) having a spacer 13 having almost the same thickness as an image receiving sheet 31 in a wider portion of a toner sheet 32 than the image receiving sheet 31. The spacer 13 is made up of a large frame and a small frame along the surroundings of the image receiving sheet 31. In FIG. 5, the two frames are spaced from each other with one hole column (row) of the dummy sheet 12 between. Each of the two frames is attached on one side to the dummy sheet 12 or is formed on one side integrally with the dummy sheet 12. However, the spacer 13 is not limited to the frames; it may be two strips of almost the same length as the image receiving sheet 31, placed at both left and right ends in the drum rotation direction between the image receiving sheet 31 and the toner sheet 32, as shown in FIG. 6. At this time, the two strips are spaced from each other with one hole column of the dummy sheet 12 between.

Figure 7:
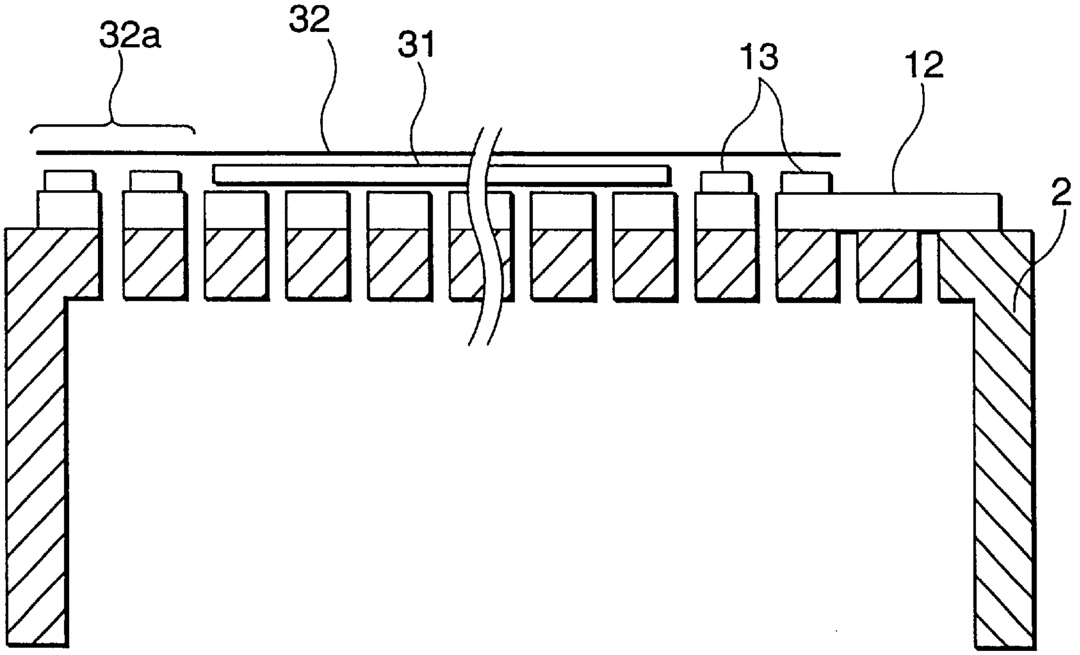
FIG. 7 is a sectional view of FIG. 5.
Figure 8:
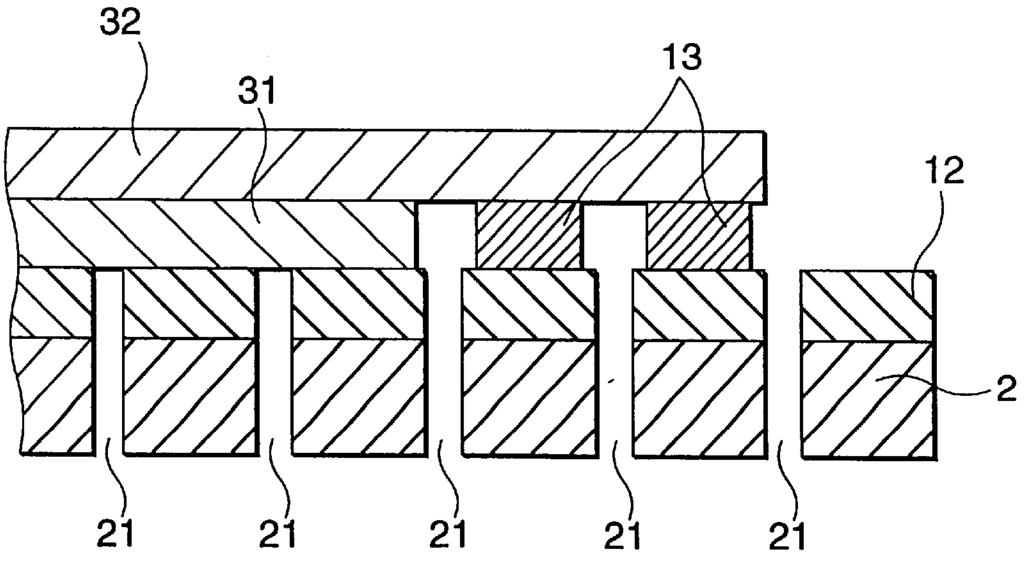
FIG. 8 is an enlarged view of a part of FIG. 7.
Figure 9:
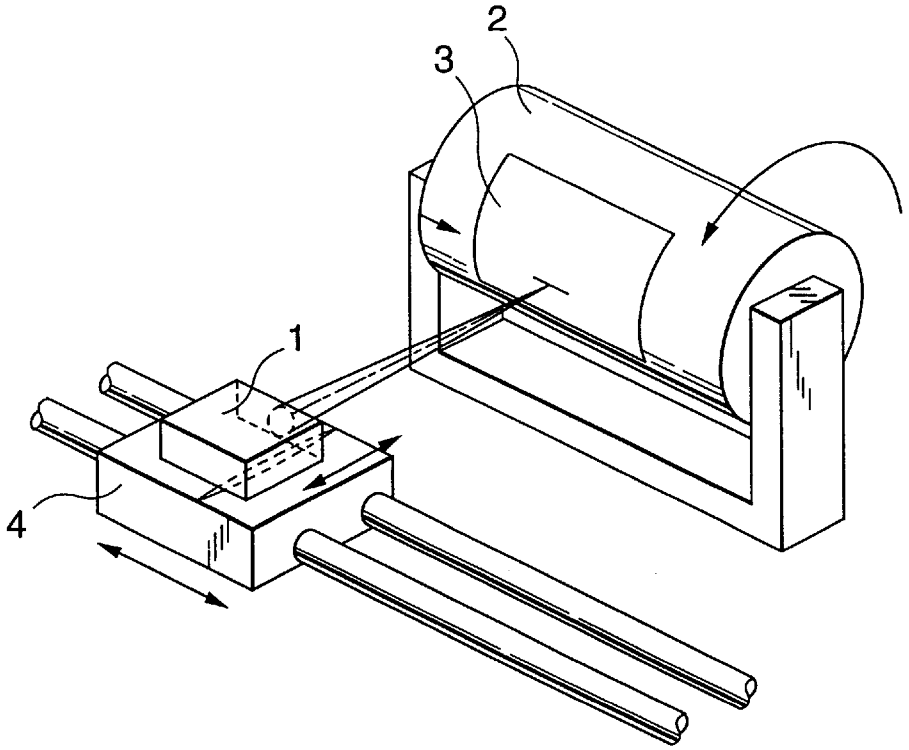
FIG. 9 is a perspective view of the main part of a image recording apparatus.
Figure 10:
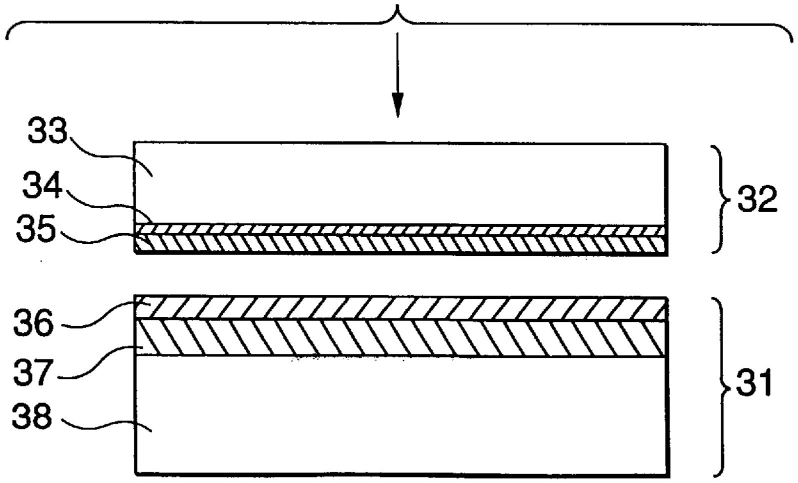
FIG. 10 is an illustration to show the structures of a image receiving sheet and a toner sheet constituting a recording medium.
Figure 11A:
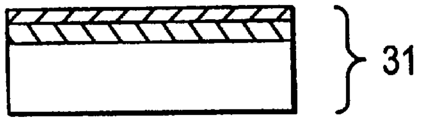
FIGS. 11(*a*) to (*f*) are illustrations to show a specific image recording procedure in the image recording apparatus.
Figure 11B:
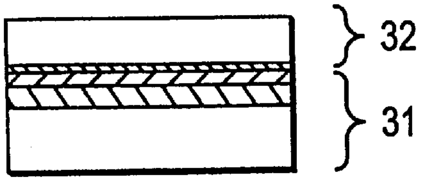
Figure 11C:
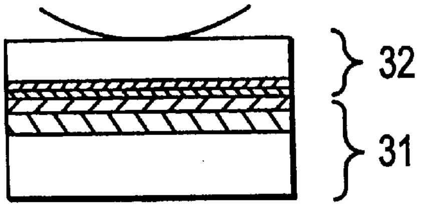
Figure 11D:
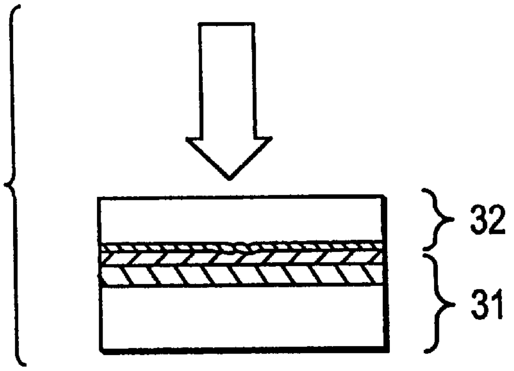
Figure 11E:
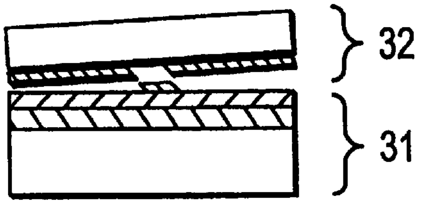
Figure 11F:
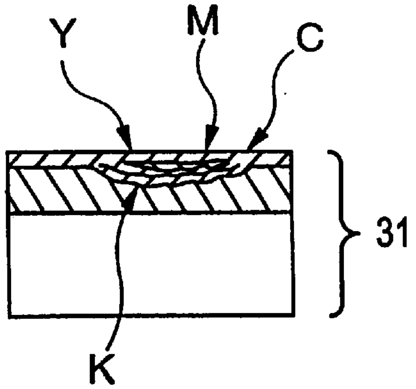
Figure 12:
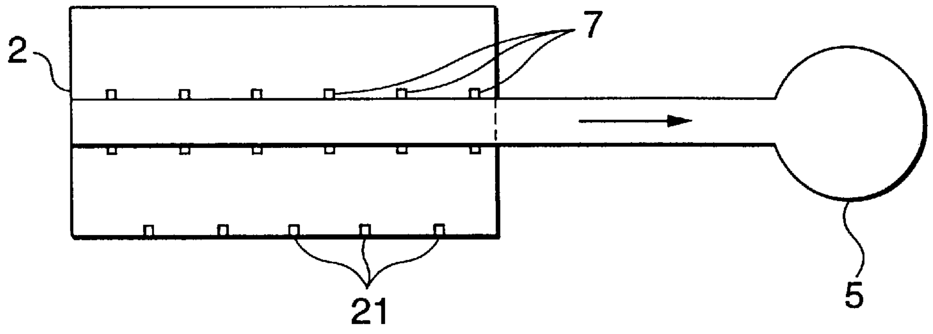
FIG. 12 is a sectional view to show the principle of an attraction mechanism of a related rotary drum.

FIG. 7 is a sectional view of the state in which the dummy sheet 12 and the recording medium 11 are attached to the rotary drum 2, wherein the dummy sheet 12 and the recording medium 11 are not hatched. As shown in FIG. 7, the spacer 13 is placed in a wider portion 32*a* of the toner sheet 32 than the image receiving sheet 31 for correcting the thickness of the toner sheet 32 relative to the image receiving sheet 31. FIG. 8 is an enlarged view of a part of FIG. 7.

The spacer 13 removes the level difference between the toner sheet 32 and the image receiving sheet 31 and thus can prevent the level difference from causing the toner sheet 32 to become deformed and deformation of the toner sheet 32 from causing attraction leakage, so that good transfer with no image unevenness is enabled.

In the first and second embodiments, the recording medium 11 is portrait with respect to the rotary drum 2, but if the recording medium 11 is landscape, a dummy sheet formed in response to the form of the recording medium 11 may be provided, namely, dummy sheets in portrait and landscape formats may be provided.

In the first and second embodiments, the dummy sheet 10, 12 is formed with the holes and groove made matching the attracting holes 21 and the attraction groove 22 of the rotary drum 2. However, if a part of the dummy sheet is formed of a porous material, through groove and/or through holes matching the placement of the attraction groove and the attracting holes of the rotary drum need not be formed. The porous material used here may be not only sponge, but also porous ceramic, sintered substance, hard polyurethane, metal mesh laminate, expand metal, etc.

In the first embodiment, the dummy sheet 10 may be formed into a non-rectangular unless it is able to close the attracting holes or grooves. For example, the dummy sheet 10 may be formed into an L letter, an inverse L letter, or a rectangular frame, which is capable of closing the attracting holes or grooves located where is other than the area on which the recording media is placed. At this time, preferably attracting holes are made in the recording medium side.

The dummy sheet 10 is fixed using vacuum attraction, tape, a chucking mechanism, or the like or using them in combination.

As described above, according to the present invention, if it is used a recording medium of a size other than the size matching the placement of the attraction groove and the attracting holes of the rotary drum, attraction leakage little occurs, thus the recording medium is not detached from the rotary drum or image unevenness is not caused by insufficiently intimate contact between the toner sheet and the image receiving sheet making up the recording medium.

The dummy sheet on which a recording medium is placed is provided with the spacer having almost the same thickness as the image receiving sheet in a wider portion of the toner sheet than the image receiving sheet, so that the spacer can prevent the level difference between the toner sheet and the image receiving sheet from causing the toner sheet to become deformed and deformation of the toner sheet from causing attraction leakage; good transfer with no image unevenness can be provided.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An image recording apparatus comprising:

a rotary drum for attracting a recording medium to the surface thereof on which a plurality of through holes are formed, the rotary drum for attracting the recording medium via the plural holes by reducing pressure therein;

a laser head for emitting a laser beam toward the recording medium on the rotary drum to record an image thereon; and a dummy sheet having an attracting area in which a plurality of through holes are formed, the area having a size substantially equal to the recording medium, the dummy sheet placed between the recording medium and the surface of the rotary drum such that the recording medium is placed on the attracting area and such that the plural through holes of the attracting area and the plural through holes of the rotary drum are superposed, wherein the recording medium comprises a toner sheet having a toner layer and an image receiving sheet having a smaller size than the toner sheet for receiving toner transferred by the laser beam.

2. The image recording apparatus as set forth in claim 1, wherein the dummy sheet includes a spacer to be interposed between the surface thereof and the toner sheet.

3. The image recording apparatus as set forth in claim 2, wherein the thickness of the spacer is substantially equal to the thickness of the image receiving sheet.

4. The image recording apparatus as set forth in claim 2, wherein the spacer is provided on a circumferencial portion of the attracting area.

5. The image recording apparatus as set forth in claim 1, wherein the dummy sheet is formed into a size covering an outer periphery of the rotary drum.

6. The image recording apparatus as set forth in claim 1, wherein the plural through holes of the dummy sheet and the rotary drum include through holes formed into a slit shape.

7. The image recording apparatus as set forth in claim 1, further comprising a plurality of kinds of dummy sheets having a plurality of sizes of attracting area corresponding to sizes of an image recording medium to be used, wherein a dummy sheet having a suitable size of the attracting area is selected and placed on the surface of the rotary drum before the recording medium is placed on the rotary drum.

8. An image recording apparatus comprising:

a rotary drum for attracting a recording medium to the surface thereof on which a plurality of through holes are formed, the rotary drum for attracting the recording medium via the plural holes by reducing pressure therein;

a laser head for emitting a laser beam toward the recording medium on the rotary drum to record an image thereon; and a dummy sheet having an attracting area made of a porous material, the attracting area having a size substantially equal to the recording medium, the dummy sheet placed between the recording medium and the surface of the rotary drum such that the recording medium is placed on the attracting area.

9. The image recording apparatus as set forth in claim 8, wherein the recording medium includes a toner sheet having a toner layer and an image receiving sheet having a smaller size than the toner sheet for receiving toner transferred by the laser beam, and wherein the dummy sheet includes a spacer to be interposed between the surface thereof and the toner sheet.

10. The image recording apparatus as set forth in claim 9, wherein the thickness of the spacer is substantially equal to the thickness of the image receiving sheet.

11. The image recording apparatus as set forth in claim 9, wherein the spacer is provided on a circumferencial portion of the attracting area.

12. The image recording apparatus as set forth in claim 8, wherein said porous material comprises an open-cell structure.

13. The image recording apparatus as set forth in claim 8, wherein the dummy sheet is formed into a size covering an outer periphery of the rotary drum.

14. The image recording apparatus as set forth in claim 8, further comprising a plurality kinds of dummy sheets having a plurality sizes of attracting area corresponding to sizes of an image recording medium to be used, wherein a dummy sheet having a suitable size of the attracting area is selected and placed on the surface of the rotary drum before the recording medium is placed on the rotary drum.

15. A dummy sheet placed on a rotary drum for attracting a recording medium to the surface thereof on which a plurality of through holes are formed, the rotary drum for attracting the recording medium via the plural holes by reducing pressure therein, comprising:

an attracting area in which a plurality of through holes are formed, the area having a size substantially equal to the recording medium, wherein the dummy sheet is placed between the recording medium and the surface of the rotary drum such that the recording medium is placed on the attracting area and such that the plural through holes of the attracting area and the plural through holes of the rotary drum are superposed, wherein the recording medium comprises a toner sheet having a toner layer and an image receiving sheet having a smaller size than the toner sheet for receiving toner transferred by a laser beam.

16. The dummy sheet as set forth in claim 15, wherein the dummy sheet includes a spacer to be interposed between the surface thereof and the toner sheet.

17. The dummy sheet as set forth in claim 16, wherein the thickness of the spacer is substantially equal to the thickness of the image receiving sheet.

18. The dummy sheet as set forth in claim 16, wherein the spacer is provided on a circumferencial portion of the attracting area.

19. The dummy sheet as set forth in claim 15, wherein the dummy sheet is formed into a size covering an outer periphery of the rotary drum.

20. The dummy sheet as set forth in claim 15, wherein the plural through holes of the dummy sheet and the rotary drum include through holes formed into a slit shape.

21. A dummy sheet placed on a rotary drum for attracting a recording medium to the surface thereof on which a plurality of through holes are formed, the rotary drum for attracting the recording medium via the plural holes by reducing pressure therein, comprising:

an attracting area made of a porous material, the area having a size substantially equal to the recording medium, wherein the dummy sheet is placed between the recording medium and the surface of the rotary drum such that the recording medium is placed on the attracting area.

22. The dummy sheet as set forth in claim 21, wherein the recording medium includes a toner sheet having a toner layer and an image receiving sheet having a smaller size than the toner sheet for receiving toner transferred by the laser beam, and wherein the dummy sheet includes a spacer to be interposed between the surface thereof and the toner sheet.

23. The dummy sheet as set forth in claim 22, wherein the thickness of the spacer is substantially equal to the thickness of the image receiving sheet.

24. The dummy sheet as set forth in claim 22, wherein the spacer is provided on a circumferencial portion of the attracting area.

25. The dummy sheet as set forth in claim 21, wherein said porous material comprises an open-cell structure.

26. The dummy sheet as set forth in claim 21, wherein the dummy sheet is formed into a size covering an outer periphery of the rotary drum.

* * * * *